US009687983B1

(12) United States Patent
Prats

(10) Patent No.: US 9,687,983 B1
(45) Date of Patent: Jun. 27, 2017

(54) GENERATING A GRASP POSE FOR GRASPING OF AN OBJECT BY A GRASPING END EFFECTOR OF A ROBOT

(71) Applicant: X Development LLC, Mountain View, CA (US)

(72) Inventor: Mario Prats, Palo Alto, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 15/151,926

(22) Filed: May 11, 2016

(51) Int. Cl.
| | |
|---|---|
| G05B 15/00 | (2006.01) |
| B25J 9/16 | (2006.01) |
| B25J 19/02 | (2006.01) |
| H04N 13/02 | (2006.01) |
| G06T 7/00 | (2017.01) |

(52) U.S. Cl.
CPC .......... *B25J 9/1612* (2013.01); *B25J 9/1697* (2013.01); *B25J 19/021* (2013.01); *G06T 7/0042* (2013.01); *H04N 13/0203* (2013.01); *G05B 2219/40442* (2013.01); *Y10S 901/09* (2013.01); *Y10S 901/47* (2013.01)

(58) Field of Classification Search
CPC ...... B25J 9/1612; B25J 9/1697; B25J 19/021; G06T 7/0042; H04N 13/0203
See application file for complete search history.

(56) References Cited

U.S. PATENT DOCUMENTS

| 8,576,253 B2 | 11/2013 | Wilson |
| 9,050,723 B1 | 6/2015 | Elazary et al. |
| 2013/0041502 A1 | 2/2013 | Shi et al. |
| 2013/0226344 A1* | 8/2013 | Wong ..................... G05D 1/024 700/258 |
| 2017/0046865 A1* | 2/2017 | Cantwell ................ G06T 13/40 |

OTHER PUBLICATIONS

Tsui, Katherine M., Dae-Jin Kim, Aman Behal, David Kontak, and Holly A. Yanco. "I want that: Human-in-the-loop control of a wheelchair-mounted robotic arm." Applied Bionics and Biomechanics 8, No. 1 (2011): 127-147.
Miller, Andrew T., and Peter K. Allen. "Graspit! A Versatile Simulator for Robotic Grasping." Robotics & Automation Magazine, IEEE 11, No. 4 (2004): 140 pages.
(Continued)

*Primary Examiner* — Ian Jen
(74) *Attorney, Agent, or Firm* — Middleton Reutlinger

(57) ABSTRACT

Generating a grasp pose for grasping of an object by an end effector of a robot. An image that captures at least a portion of the object is provided to a user via a user interface output device of a computing device. The user may select one or more pixels in the image via a user interface input device of the computing device. The selected pixel(s) are utilized to select one or more particular 3D points that correspond to a surface of the object in the robot's environment. A grasp pose is determined based on the particular 3D points. For example, a local plane may be fit based on the particular 3D point(s) and a grasp pose determined based on a normal of the local plane. Control commands can be provided to cause the grasping end effector to be adjusted to the grasp pose, after which a grasp is attempted.

18 Claims, 10 Drawing Sheets

(56) References Cited

OTHER PUBLICATIONS

Aleotti, Jacopo, and Stefano Caselli. "Grasp Recognition in Virtual Reality for Robot Pregrasp Planning by Demonstration." In Robotics and Automation, 2006. ICRA 2006. Proceedings 2006 IEEE International Conference on, pp. 2801-2806. IEEE, 2006.
Leeper et al. "Strategies for Human-in-the-Loop Robotic Grasping." In Proceedings of the seventh annual ACM/IEEE international conference on Human-Robot Interaction, pp. 1-8. ACM, 2012.
Zubrycki, Igor, and Grzegorz Granosik. "Intuitive User Interfaces for Mobile Manipulation Tasks." Journal of Automation Mobile Robotics and Intelligent Systems 9 (2015); pp. 41-52.

* cited by examiner

US 9,687,983 B1

GENERATING A GRASP POSE FOR GRASPING OF AN OBJECT BY A GRASPING END EFFECTOR OF A ROBOT

BACKGROUND

Many robots are programmed to utilize one or more end effectors to grasp one or more objects. For example, a robot may utilize a grasping end effector such as an "impactive" grasping end effector or "ingressive" grasping end effector (e.g., physically penetrating an object using pins, needles, etc.) to pick up an object from a first location, move the object to a second location, and drop off the object at the second location. Some additional examples of robot end effectors that may grasp objects include "astrictive" grasping end effectors (e.g., using suction or vacuum to pick up an object) and one or more "contigutive" grasping end effectors (e.g., using surface tension, freezing or adhesive to pick up an object), to name just a few.

While humans innately know how to correctly grasp many different objects, determining an appropriate manner to grasp an object for manipulation of that object may be a difficult task for robots. Despite the difficulty, approaches have been proposed in which robots fully-autonomously grasp various objects. However, some fully-autonomous approaches may suffer from one or more drawbacks, such as failure to autonomously generate grasp candidates for some objects and/or failure of some attempted grasps that are autonomously generated.

Moreover, in view of the difficulty of the grasping task for robots, techniques have been proposed in which a "human-in-the-loop" may utilize a graphical user interface to fully specify a full pose (position and orientation) of an end effector for a grasp of an object by a robot. For instance, in one approach a full 3D representation of the end effector and a full 3D representation of the object may be presented to the user via the graphical user interface. Using the graphical user interface, the user may manipulate the 3D representation of the end effector relative to the 3D representation of the object to specify the full pose of the end effector for the grasp of the object. However, some human-in-the-loop approaches may suffer from one or more drawbacks. For example, some may be relatively demanding of a human's time in fully specifying a full pose and/or relatively demanding of computational resources in generating a manipulable full 3D representation of an end effector and object. Also, for example, some may require that full 3D representations of the end effector and of the object be available. Additional and/or alternative drawbacks of these and/or other approaches may be presented.

SUMMARY

This specification is directed to methods and apparatus related to generating a grasp pose for grasping of an object by an end effector of a robot. In various implementations of the methods and apparatus described herein, a "human-in-the-loop" technique is utilized that may be less demanding of the human's time, and/or of computational resources (e.g., of at least the computing device being utilized by the human), than some other human-in-the-loop techniques (e.g., those where the user fully manipulates a 3D representation of an end effector to define a full pose of the end effector).

In some implementations, an image that captures at least a portion of an object in a robot's environment is provided to a human via a user interface output device (e.g., a display) of a computing device of the user. The user may select one or more pixels in the image via a user interface input device (e.g., mouse, touch-screen) of the computing device. In some of those implementations: the selected pixel(s) are utilized to select one or more particular 3D points that correspond to a surface of the object in the robot's environment; a plane is fit locally (e.g., via least squares fitting or principle component analysis (PCA)) based on the selected particular 3D point(s) and optionally based on one or more neighboring 3D points; and a grasp pose is determined based on the local plane. For example, an approach vector for the grasp may be determined based on the local plane (e.g., based on the normal of the local plane) and a grasp pose can be determined based on the approach vector. The grasp pose defines a full six-dimensional pose of a grasping end effector of the robot prior to (e.g., immediately prior to) an attempted grasp utilizing the grasping end effector. Control commands can be provided to cause the grasping end effector to be adjusted to the grasp pose, after which a grasp may be attempted (e.g., using force control to determine when the grasping end effector contacts the object).

In some implementations, a method is provided that includes providing an image for display on a client computing device. The provided image captures at least a portion of an object in an environment and is generated based on image data generated by one or more cameras that are associated with a robot and that are viewing the environment. The method further includes receiving selection data in response to providing the image. The selection data indicates one or more selected pixels of the image. The selected pixels are a subgroup of pixels of the image and are selected by a user via a user interface input device of the client computing device. The method further includes selecting, based on the one or more selected pixels indicated by the selection data, at least one particular three-dimensional (3D) point from a group of 3D points. The group of 3D points are generated based on the image data generated by the cameras or are determined based on additional sensor data generated by a 3D scanner that is associated with the robot and that is viewing the environment. The method further includes fitting a local plane based on the particular 3D point and based on one or more additional 3D points, of the group of 3D points, that are in a neighborhood of the particular 3D point. The method further includes identifying a grasp approach vector based on a normal of the local plane, determining a grasp pose that conforms to the grasp approach vector and that avoids collision with the object and with other objects in the environment, and providing one or more control commands that cause a grasping end effector of the robot to traverse to the grasp pose and attempt a grasp of the object subsequent to traversing to the grasp pose.

This method and other implementations of technology disclosed herein may each optionally include one or more of the following features.

In some implementations, the one or more selected pixels are selected based on a single selection via the user interface input device. In some of those implementations, selecting the particular 3D point based on the selected pixels includes determining that the particular 3D point is mapped directly to one pixel of the one or more selected pixels. In some version of those implementations, the 3D point is determined based on the image data utilized to generate the image and the method further includes mapping the one pixel to the particular 3D point based on the one pixel being utilized to generate the particular 3D point.

In some implementations, determining the grasp pose includes generating a plurality of candidate grasp poses that each conform to the grasp approach vector and selecting the grasp pose from the candidate grasp poses. In some of those implementations, the selecting the grasp pose from the candidate grasp poses is based on the grasp pose avoiding collision with the object and with other objects in the environment and/or one or more additional criteria.

In some implementations, the one or more selected pixels include a plurality of pixels selected based on at least two selections via the user interface input device. In some of those implementations, the particular 3D point is not mapped directly to any of the selected pixels. In some of those implementations, the two selections are opposed to one another and the particular 3D point is between, in at least one dimension, other 3D points that are mapped directly to the selected pixels. In some versions of those implementations, selecting the particular 3D points based on the selected pixels includes: determining an additional pixel that is between, in the image, the selected pixels of the two selections; and selecting the particular 3D point based on the particular 3D point being mapped directly to the additional pixel. In some versions of those implementations, determining the grasp pose further includes determining the grasp pose based on the other 3D points that are mapped directly to the selected pixels. For example, determining the grasp pose based on the other 3D points that are mapped directly to the selected pixels may include projecting the other 3D points to coordinates in the local plane and determining the grasp pose based on conformance of one or more actuable members of the grasping end effector to the coordinates in the local plane.

In some implementations, a method is provided that includes determining a group of three-dimensional (3D) points. The group of 3D points are derived from image data generated by a stereographic camera associated with a robot and the group of 3D points capture at least a portion of a surface of an object in an environment. The method further includes providing, for display on a client computing device, a two-dimensional image that includes at least the portion of the surface of the object. The two-dimensional image is generated based on at least some of the image data generated by the stereographic camera. The method further includes receiving selection data in response to providing the image. The selection data indicates one or more selected pixels of the image, the selected pixels are a subgroup of pixels of the image, and the selected pixels are selected by a user via a user interface input device of the client computing device. The method further includes selecting at least one particular 3D point of the group of 3D points. The particular 3D point is selected based on it being generated based on at least one pixel of the one or more selected pixels indicated by the selection data. The method further includes determining a grasp approach vector based on the particular 3D point, determining a grasp pose that conforms to the grasp approach vector, and providing one or more control commands that cause a grasping end effector of the robot to traverse to the grasp pose and attempt a grasp of the object subsequent to traversing to the grasp pose.

This method and other implementations of technology disclosed herein may each optionally include one or more of the following features.

In some implementations, determining the grasp approach vector based on the particular 3D point includes: fitting a local plane based on the particular 3D point and based on one or more additional 3D points, of the group of 3D points, that are in a neighborhood of the particular 3D point; and identifying the grasp approach vector based on a normal of the plane. In some of those implementations, the grasp approach vector conforms strictly to the normal of the plane.

In some implementations, determining the grasp pose based on the grasp approach vector includes employing a collision checker using the grasp approach vector as a constraint and using the group of 3D points as obstacles.

Other implementations may include a non-transitory computer readable storage medium storing instructions executable by a processor (e.g., a central processing unit (CPU) or graphics processing unit (GPU)) to perform a method such as one or more of the methods described above. Yet another implementation may include a system of one or more computers and/or one or more robots that include one or more processors operable to execute stored instructions to perform a method such as one or more (e.g., all) aspects of one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2B also illustrates a local plane that may be fit based on the single selection indicated by FIG. 2A and illustrates a grasp approach vector that may be identified based on the local plane.

FIG. 5B also illustrates a local plane that may be fit based on the antipodal selection indicated by FIG. 5B and illustrates a grasp approach vector that may be identified based on the local plane.

DETAILED DESCRIPTION

In some implementations of the technology described herein, an image that captures at least a portion of an object in a robot's environment is provided to a human via a user interface output device of a computing device of the user. The user may select one or more pixels in the image via a user interface input device of the computing device. In some of those implementations: the selected pixel(s) are utilized to select one or more particular 3D points that correspond to a surface of the object in the robot's environment; a plane is fit locally based on the selected particular 3D point(s) and optionally based on one or more neighboring 3D points; and a grasp pose is determined based on the local plane. For example, an approach vector for the grasp may be determined based on the local plane and a grasp pose can be determined based on the approach vector. The grasp pose defines a full six-dimensional pose of a grasping end effector of the robot prior to an attempted grasp utilizing the grasping end effector. Control commands can be provided to cause the grasping end effector to be adjusted to the grasp pose, after which a grasp may be attempted. Additional description of these and other implementations of the technology is provided below.

Figure 1:
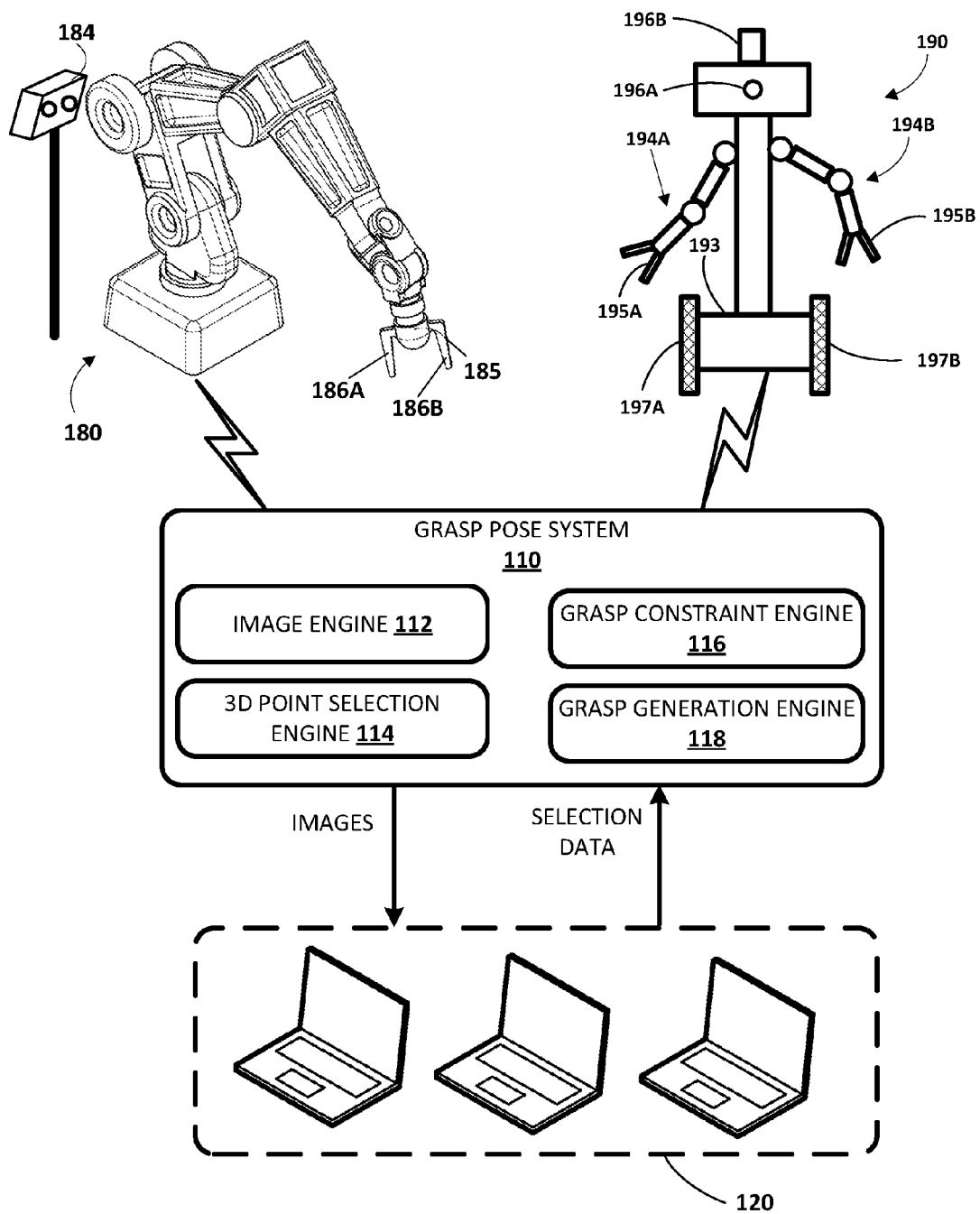
FIG. 1 illustrates an example environment in which a grasp pose may be generated, for grasping of an object by a grasping end effector of a robot, based on selection data received in response to providing an image of at least a portion of the object to a client computing device.

FIG. 1 illustrates an example environment in which in which a grasp pose may be generated for grasping of an object by a grasping end effector of a robot (e.g., robot 180, robot 190, and/or other robots). As described herein, the grasp pose may be generated based on selection data received in response to providing an image of at least a portion of the object to a client computing device, such as one of client computing devices 120.

Example robots 180 and 190 are illustrated in FIG. 1. Robot 180 is a "robot arm" having multiple degrees of freedom to enable traversal of a grasping end effector 185 of the robot 180 along any of a plurality of potential paths to position the grasping end effector 185 in any one of a plurality of desired poses. As used herein, a pose of an end effector references a full six-dimensional ("6D") pose of the end effector that specifies both a position and an orientation of the end effector. In some implementations, the position of the end effector may be the position of a reference point of the end effector. In some implementations, the reference point of an end effector may be a center of mass of the end effector, and/or a point near where end effector attaches to other components of the robot, though this is not required.

The pose of an end effector may be defined in various manners, such as in joint space and/or in Cartesian/configuration space. A joint space pose of an end effector may be a vector of values that define the states of each of the operational components that dictate the position of the end effector. A Cartesian space pose of an end effector may utilize coordinates or other values that define all six degrees of freedom of the end effector relative to a reference frame. It is noted that some robots may have kinematic redundancy and that more than one joint space pose of an end effector may map to the same Cartesian space pose of the end effector in those robots.

Robot 180 further controls two opposed actuable members 186A and 186B of the end effector 185 to actuate the actuable members 186A and 186B between at least an open position and a closed position (and/or optionally a plurality of "partially closed" positions). As described herein, robot 180 may operate semi-autonomously at least part of the time and control operational components thereof to grasp objects based on grasp poses generated by grasp pose system 110. As also described herein, the grasp poses generated by grasp pose system 110 are based on selection data received from one or more client computing device 120 in response to human operator(s) making selections via user interface input devices of those computing devices. As used herein, an "operational component" of a robot may refer to actuators, motors (e.g., servo motors), joints, shafts, gear trains, pumps (e.g., air or liquid), pistons, drives, and/or other components that may create and/or undergo propulsion, rotation, and/or motion. Some operational components may be independently controllable, although this is not required. In some instances, the more operational components robot 180 has, the more degrees of freedom of movement it may have.

Stereographic camera 184 is also illustrated in FIG. 1. In some implementations, a stereographic camera includes two or more sensors (e.g., charge-coupled devices (CCDs)), each at a different vantage point and each generating image data. Each of the two sensors generates image data and the image data from each sensor at a given instance may be utilized to generate a two-dimensional ("2D") image at the given instance. Moreover, based on image data generated by the two sensors, three-dimensional ("3D") point cloud data may also be generated, where each of the 3D points of the 3D point cloud defines a 3D coordinate of a surface of a corresponding object. For example, a 3D point may be determined to be the intersection point of a first ray from a first pixel of a first image generated by one of the sensors at a given instance and a second ray from a corresponding second pixel of a second image generated by the other sensor at or near the given instance (where the rays "project" from the images based on "known" geometries between the images (e.g., the known baseline and angles between the two sensors)). In some other implementations, a stereographic camera may include only a single sensor and one or more mirrors utilized to effectively capture image data from two different vantage points. In various implementations, a stereographic camera may be a projected-texture stereo camera. For example, the stereographic camera may be a projected-texture stereo camera that also includes a projector that projects a pattern in infrared and senses the projected pattern (e.g., the sensed pattern may be included in image data generated by one or more sensors of the camera). The sensed pattern may also be utilized in generating the 3D point cloud data.

In FIG. 1, stereographic camera 184 is mounted at a fixed pose relative to the base or other stationary reference point of robot 180. The stereographic camera 184 has a field of view of at least a portion of the workspace of the robot 180, such as the portion of the workspace that is near grasping end effector 185. Although a particular mounting of stereographic camera 184 is illustrated in FIG. 1, additional and/or alternative mountings may be utilized. For example, in some implementations, stereographic camera 184 may be mounted directly to robot 180, such as on a non-actuable component of the robot 180 or on an actuable component of the robot 180 (e.g., on the end effector 185 or on a component close to the end effector 185). Also, for example, in some implementations, the stereographic camera 184 may be mounted on a non-stationary structure that is separate from the robot 180 and/or may be mounted in a non-stationary manner on a structure that is separate from robot 180.

The robot 190 includes robot arms 194A and 194B with corresponding end effectors 195A and 195B, that each take the form of a gripper with two opposing actuable members. The robot 190 also includes a base 193 with wheels 197A and 197B provided on opposed sides thereof for locomotion of the robot 190. The base 193 may include, for example, one or more motors for driving corresponding wheels 197A and 197B to achieve a desired direction, velocity, and/or acceleration of movement for the robot 190.

The robot 190 also includes a monographic camera 196A and a 3D laser scanner 196B. A monographic camera captures image data and the image data at a given instance may be utilized to generate a two-dimensional ("2D") image at the given instance. A 3D laser scanner includes one or more lasers that emit light and one or more sensors that generate sensor data related to reflections of the emitted light. The generated sensor data from a 3D laser scanner may be utilized to generate a 3D point cloud, where each of the 3D points of the 3D point cloud defines a 3D coordinate of a surface of a corresponding object. A 3D laser scanner may be, for example, a time-of-flight 3D laser scanner or a triangulation based 3D laser scanner and may include a position sensitive detector (PSD) or other optical position sensor.

As described herein, robot 190 may operate semi-autonomously at least part of the time and control operational components thereof to grasp objects based on grasp poses generated by grasp pose system 110. For example, the robot 130B may control the wheels 197A and/or 197B, the robot arms 194A and/or 194B, and/or the end effectors 195A and/or 195B to grasp objects based on grasp poses generated by grasp pose system 110.

Although particular robots 180 and 190 are illustrated in FIG. 1, additional and/or alternative robots may be utilized, including robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors.

Turning now to the grasp pose system 110, it is illustrated as separate from, but in communication with, both of robots 180 and 190. In some implementations, all or aspects of grasp pose system 110 may be implemented on robot 180 and/or robot 190 (e.g., via one or more processors of robots 180 and 190). For example, robots 180 and 190 may each include an instance of the grasp pose system 110. In some implementations, all or aspects of grasp pose system 110 may be implemented on one or more computer systems that are separate from, but in network communication with, robots 180 and/or 190. Moreover, in some of those implementations, each of the robots 180 and 190 may have their own dedicated instance of the grasp pose system 110. Also, in some implementations, all or aspects of grasp pose system 110 may be implemented on one or more of the client computing devices 120.

The image engine 112 of grasp pose system 110 provides 2D images generated based on image data captured by camera(s) associated with a robot to one or more of the client computing devices 120 for display of the images via those client computing devices 120. Each of the 2D images includes a plurality of pixels and values defined for each of one or more channels of each of the pixels. For example, a 2D image may include a plurality of pixels each having red, green, and blue channels and may define, for each of the channels for each of the pixels, a value (e.g., from 0 to 255).

As one example, the image engine 112 may provide, to one of the client computing devices 120, a 2D image generated based on image data from one of the sensors of the stereographic camera 184. As another example, the image engine 112 may provide, to one of the client computing devices 120, a 2D image generated based on image data from the monographic camera 196A.

In some implementations, the image engine 112 provides the image to one of the client computing devices in response to an assistance request generated by one of the robots. For example, robot 180 may first attempt to autonomously determine an appropriate grasp pose for an object and/or actually attempt a grasp of the object, and may submit an assistance request and image data to the grasp pose system 110 only when one or both of the attempts are unsuccessful. Also, for example, robot 180 may submit an assistance request and image data to the grasp pose system 110 any time the robot 180 is requested to perform a grasp and/or or anticipates a grasp will need to be performed. In some implementations, an assistance request of a robot may include object information that identifies one or more characteristics of the object the robot is attempting to grasp. Characteristics may include, for example, a name or other identifier of the object (e.g., "spatula", "spoon"), a position, size, and/or orientation of the object, a class to which the object belongs (e.g., "kitchen utensil"), etc.

In some implementations, the image engine 112 optionally preprocesses an image prior to providing it for display on one of the client computing devices 120. For example, the image engine 112 may crop the image, resize the image, alter colors in the image, annotate the image, etc. For instance, an assistance request from a robot may include a position and size of the object the robot is attempting to grasp and the image engine 112 may utilize the position and size to crop the image so that the object is included while other objects are excluded and/or to draw a "bounding polygon" around the object and/or to otherwise highlight the object. Also, for instance, the image engine 112 may include, or be in communication with, an object detection engine that is configured to detect one or more particular objects and/or classes of objects. The image engine 112 may preprocess the image to "crop in" or "crop out" certain objects (e.g., to keep in relevant object(s)) or to alter the color of certain objects (e.g., to make irrelevant objects "grayscale").

Figure 2A:
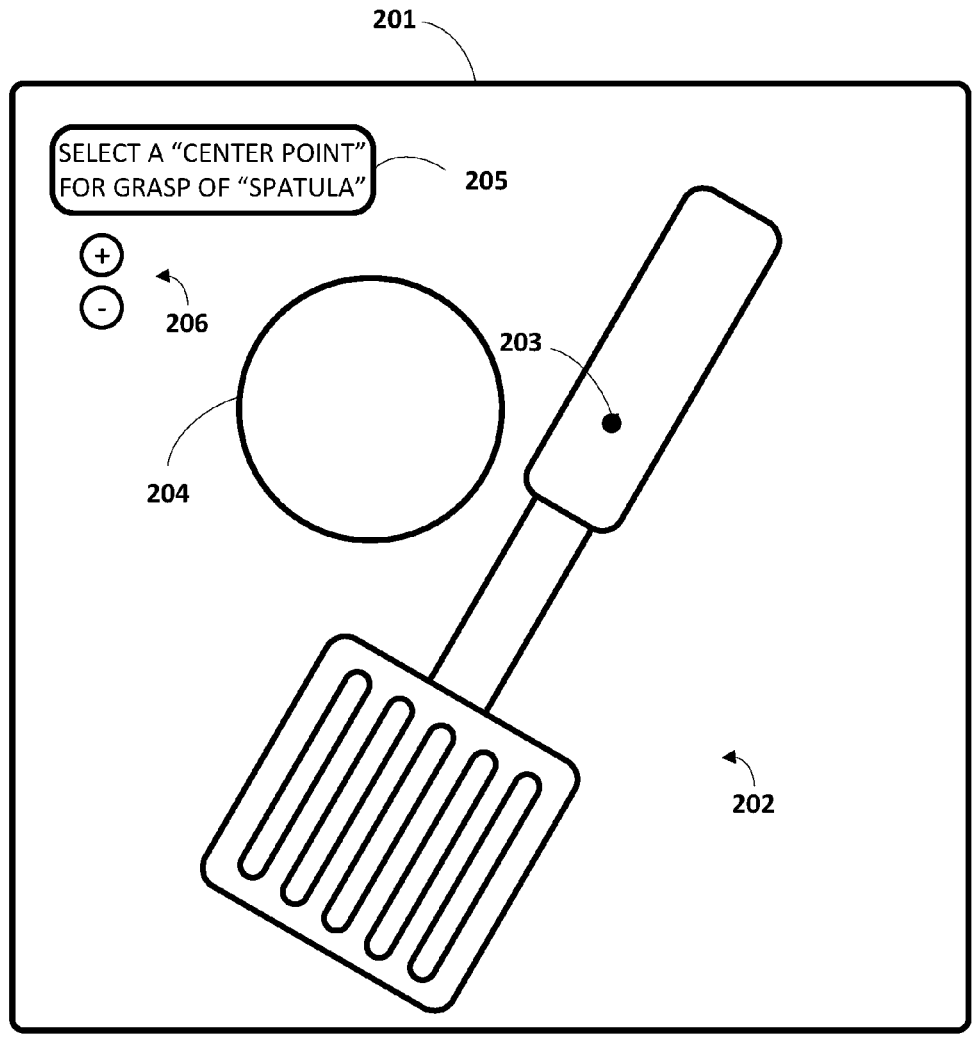
FIG. 2A illustrates an example graphical user interface that may be provided for display on a client computing device; the example graphical user interface of FIG. 2A includes an image of an object in a robot's environment and also illustrates an example of a single selection that may be made by a user via a user interface input device of the client computing device.

FIG. 2A illustrates one particular example of an image that may be provided by image engine 112 for display on one of the client computing devices 120. FIG. 2A illustrates an example graphical user interface 201 that may be displayed by one of the client computing devices 120. The example graphical user interface 201 of FIG. 2A includes an image of a spatula 202 and a circular object 204 that are present in the environment of a robot. The image is generated based on image data from one or more cameras associated with a robot and viewing the environment of the robot. For example, the image may be generated based on image data from stereographic camera 184 while the spatula 202 and circular object 204 are in the environment of the robot 180.

The graphical user interface 201 also includes a notification 205 and viewport controls 206. The notification 205 informs the user viewing the graphical user interface 201 of the target object for grasping and of the type of selection that should be made to provide input for generating the grasp of the target object. The viewport controls 206 may be actuated by the user to enable the user to zoom in or out on the image. The user may additionally or alternatively utilize alternative user interface input devices to zoom in or out on the image, to pan the view of the image, or otherwise adjust the viewport of the image. In some implementations, the image engine 112 provides only the image for display on one of the client computing devices 120 and a separate application of one of the client computing devices 120 incorporates the image in the graphical user interface 201. In some implementations, the image engine 112 incorporates the image in the graphical user interface 201 and provides the graphical user interface 201 and the image for display on one of the client computing devices 120. In some implementations, only the image may be provided in the graphical user interface 201.

The 3D point selection engine 114 receives selection data in response to the image provided by image engine 112. The selection data indicates one or more selected pixels of the image provided by the image engine 112. The selection data is generated in response to at least one selection made by a user while viewing the image via one of the client computing devices 120. The selection is made by the user via a user interface input device of the client computing device. Although client computing devices 120 are illustrated as laptops in FIG. 1, it is understood that additional and/or alternative computing devices may be provided, such as tablets, smart phones, desktop computers, etc.

In some implementations, the selection of the user is a "single selection" of the image that generally indicates a "center" point for a grasp of the object. The single selection may be, for example, a single click on the image with a mouse, a single "tap" on a screen displaying the image, a single click on the image with a joystick, etc. In "single selection" implementations, the selection data indicates one or more pixels of the image covered by the single selection, such as all pixels covered by the selection, a single pixel covered by the selection, an "average", "central", or other pixel determined based on statistical analysis of the selection, etc. For example, with reference to FIG. 2A, an indication 203 of a single selection that may be made by a user is illustrated. The indication 203 is on the handle of the spatula 202 and the selection data generated based on the selection indicated by the indication 203 may indicate one or more pixels of the image that are covered by the selection.

The 3D point selection engine 114 selects at least one particular 3D point based on the one or more selected pixels of the image that are indicated by the selection data. The particular 3D point is selected from a group of 3D points that capture at least a portion of the surface of the object in the environment—and is selected based on a mapping (direct or indirect) between the selected pixel(s) and the particular 3D point(s). For example, in some "single selection" implementations, the 3D point selection engine 114 may select particular 3D points that map directly to the one or more selected pixels indicated by the selection data. For instance, a selected pixel may be of a portion of a surface of an object and the 3D point selection engine 114 may select particular 3D point(s) that correspond directly to that portion of the surface of the object.

The 3D point selection engine 114 may utilize various techniques to determine which particular 3D point(s) are mapped to selected pixel(s). For example, in some implementations the image provided to the user by the image engine 112 may be a first image of a stereographic camera of a robot (e.g., stereographic camera 184). In some of those implementations, the first image and a second image from the stereographic camera that is captured at a different vantage point (e.g., another image from another sensor of the stereographic camera) may be utilized to determine the 3D points. For example, a 3D point may be determined to be the intersection point of a first ray from a first pixel of the first image and a second ray from a corresponding second pixel of the second image (where the rays "project" from the images based on "known" geometries between the images (e.g., the known geometries between two cameras of a stereographic camera)). Accordingly, in implementations in which the image provided to the user is a first image from a stereographic camera of a robot, each pixel of that image may be directly mapped to a corresponding 3D point based on a ray from that pixel being utilized to calculate the 3D point. In those implementations, the 3D point selection engine 114 may utilize the direct mappings between pixels and 3D points to determine particular 3D point(s) that map to selected pixel(s).

As another example, in some implementations the image provided to the user by the image engine 112 may be an image from a camera (stereo or mono) of a robot (e.g., monographic camera 196A) and the 3D points may be generated based on a laser scanner (e.g., laser scanner 196B) or other 3D scanner (e.g., a separate stereo camera). The image from the camera and the 3D points may optionally be generated based on corresponding sensor data generated at or near the same time. The poses of the camera and the 3D scanner may be known and those poses utilized to determine direct mappings between pixels of an image captured by the camera and 3D points generated by the 3D scanner. In those implementations, the 3D point selection engine 114 may utilize the direct mappings between pixels and 3D points to determine particular 3D point(s) that map to selected pixel(s).

In some implementations, the selection of the user includes "multiple selections" of the image such as two clicks on the image with a mouse, two "taps" on a screen displaying the image, etc. In some multiple selection implementations, the selection data indicates multiple selections and, for each of the selections, one or more pixels covered by the selection, such as all pixels covered by the selection, a single pixel covered by the selection, an average pixel determined based on statistical analysis of the selection, etc.

In multiple selection implementations, the 3D point selection engine 114 may select one or more additional pixels based on the two or more selections indicated by the selection data, and utilize those additional pixels to determine one or more particular 3D points that do not map directly to pixels indicated by the selection data. For example, in some implementations the pixels associated with two separate selections may be utilized to determine one or more additional pixels in the image, such as one or more additional pixels that are "between" the pixels associated with the two selections (e.g., a pixel that is midway between the pixels of the two selections). The 3D point selection engine 114 may then determine one or more particular 3D points that map directly to those additional pixel(s).

The grasp constraint engine 116 determines one or more constraints for a grasp pose based on the particular 3D point(s) selected by the 3D point selection engine 114. In some implementations, the one or more constraints include a grasp approach vector. In some of those implementations, the grasp constraint engine 116 determines the grasp approach vector by fitting a local plane based on the 3D point(s) selected by the 3D point selection engine 114, and determining the grasp approach vector based on the local plane (e.g., based on the normal of the local plane).

Figure 2B:
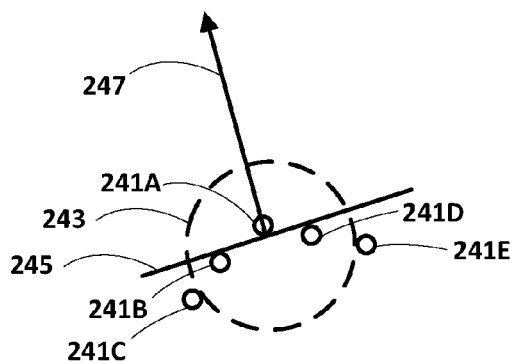
FIG. 2B illustrates some 3D points of a 3D point cloud that captures at least a portion of the surface of the object of FIG. 2A.

One particular example of determining a grasp approach vector is provided with reference to FIG. 2B. FIG. 2B illustrates some 3D points 241A-E of a 3D point cloud that captures at least a portion of the surface of the spatula 202 of FIG. 2A. It is understood that the 3D point cloud contains many additional points than those illustrated in FIG. 2B. Further, it is noted that FIG. 2B illustrates positions of the 3D points 241A-E in only two dimensions and that each of the 3D points 241A-E have a position in another dimension (one that extends "into" and "out of" the Figure) that may vary from the positions of other of the 3D points 241A-E in that dimension. In other words, the 3D points are not all necessarily coplanar with one another.

In FIG. 2B, 3D point 241A is the particular 3D point selected by 3D point selection engine 114 based on selected pixels indicated by selection data in response to the selection indicated by indication 203 of FIG. 2A. Local plane 245 is a local plane that may be fit by grasp constraint engine 116 based on the 3D point 241A and based on one or more additional 3D points, such as additional 3D points 241B and 241D that are in a neighborhood 243 of the 3D point 241A. The neighborhood 243 may extend in all three dimensions and may encompass additional 3D points not illustrated in FIG. 2B. The neighborhood 243 may vary in other implementations (e.g., it may have a different shape), and may optionally be determined based on various factors, such as density of the 3D point cloud. The grasp constraint engine 116 may utilize one or more techniques to fit the local plane, such as least squares fitting and/or principle component analysis (PCA).

FIG. 2B also illustrates a normal 247 of the local plane 245 that is determined by the grasp constraint engine 116 based on the local plane 245 and optionally based on directions of determined normal(s) for the particular 3D point 241A and/or additional 3D points (e.g., additional 3D points 241B and/or 241D). The grasp constraint engine 116 determines a grasp approach vector based on the normal 247 and defines the grasp approach vector as a constraint for a grasp pose. For instance, the grasp constraint engine 116 may determine a grasp approach vector to be a vector that is opposite from the normal, but otherwise strictly conforms to the normal.

The grasp generation engine 118 generates one or more candidate grasp poses of a grasping end effector based on the grasp approach vector and/or other constraints determined by engine 116. For example, the grasp generation engine 118 may employ a collision checker to generate multiple candidate grasp poses that each conform to the grasp approach vector (e.g., with a rotational axis of the grasping end effector aligned with the approach vector) and that do not collide with the object to be grasped and/or with other object(s) in the environment with the object to be grasped. The grasp generation engine 118 may optionally utilize a model of the grasping end effector and/or of other components of the robot to determine conformance to a grasp approach vector and may utilize the model(s) and the 3D point cloud to determine whether the grasping end effector and/or other components of the robot collide with object(s) in the environment.

One of the candidate grasp poses may then be selected as a grasp pose of a grasping end effector for utilization by a robot in attempting a grasp with the grasping end effector. As described herein, the grasp pose defines a pose (position and orientation/full 6D pose) of a grasping end effector of the robot prior to (e.g., immediately prior to) an attempted grasp utilizing the grasping end effector. Control commands can be provided to one or more operational components of the robot to cause the grasping end effector of the robot to be adjusted to the grasping pose, after which a grasp may be attempted (e.g., using force control to determine when the grasping end effector contacts the object). In some implementations, the grasp generation engine 118 generates one or more of the control commands based on the grasp pose and provides one or more of the control commands. In some implementations, the grasp generation engine 118 provides the candidate grasp pose to a control system of the robot and the control system of the robot generates the control commands based on the grasp pose.

Figure 2C:
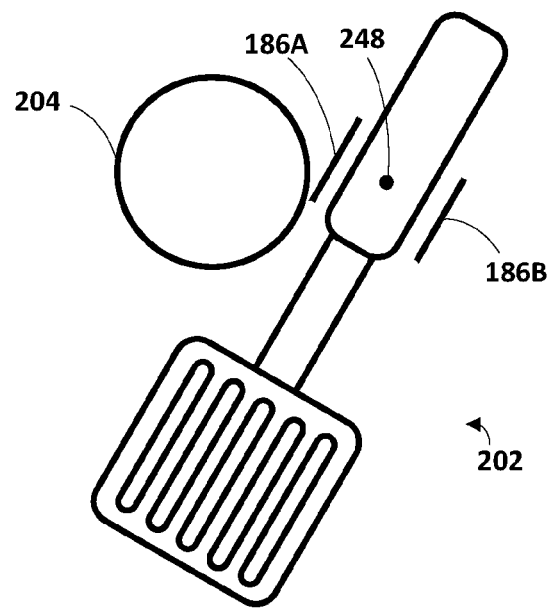
FIGS. 2C and 2D illustrate two examples of collision-free candidate grasp poses that may be generated based on the grasp approach vector of FIG. 2B.
Figure 2D:
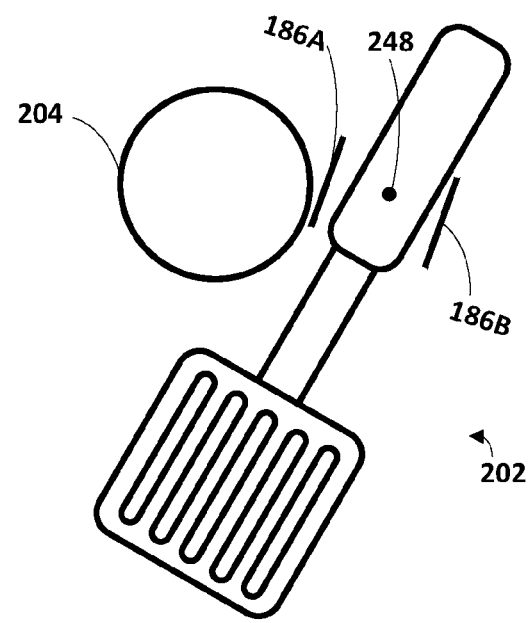
Figure 2E:
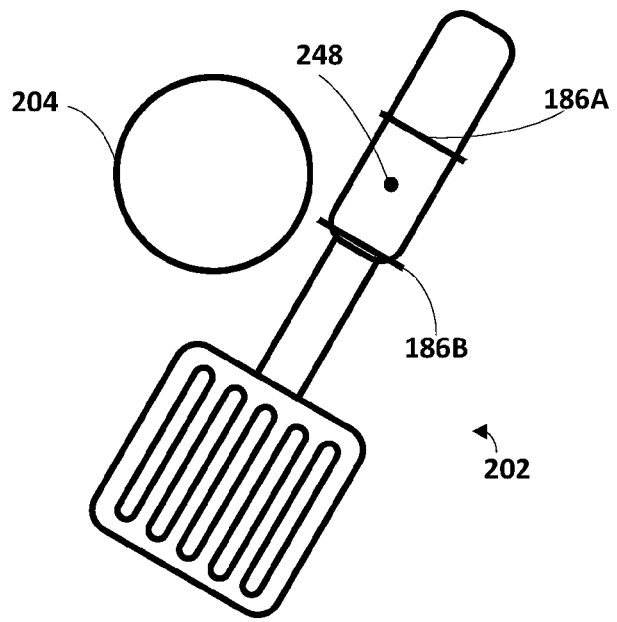
FIGS. 2E and 2F illustrate two examples of non-collision-free candidate grasp poses that may be generated based on the grasp approach vector of FIG. 2B.
Figure 2F:
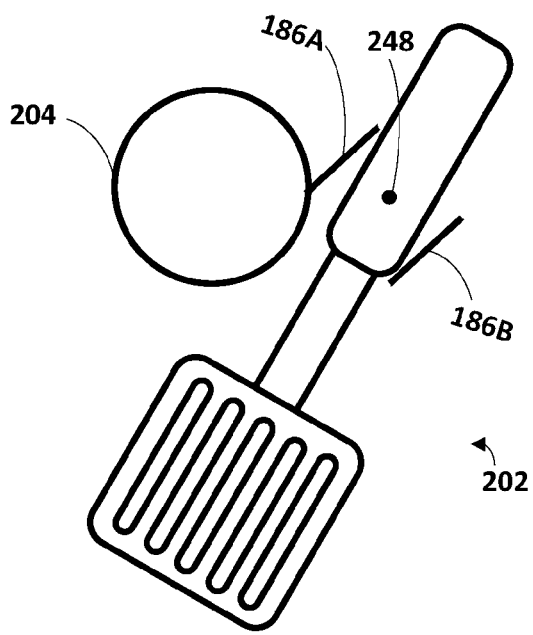

FIGS. 2C and 2D illustrate two examples of collision-free candidate grasp poses that may be generated by the grasp generation engine 118 based on the grasp approach vector of FIG. 2B. FIGS. 2E and 2F illustrate two examples of non-collision-free candidate grasp poses that may be generated based on the grasp approach vector of FIG. 2B.

In FIGS. 2C-2F the actuable members 186A and 186B of end effector 185 (FIG. 1) are illustrated and a grasp approach vector 248 is also illustrated (vector 248 is coming "out of" the Figures). In FIGS. 2C-2F only the actuable members 186A and 186B are illustrated for sake of simplicity. However, it is understood that additional structure of the grasping end effector 185 and/or of the robot 180 may be considered in generating candidate poses. Moreover, in FIGS. 2C-2F the actuable members 186A and 186B are illustrated at fixed distances from one another. However, it is understood that other candidate poses may include the actuable members 186A and 186B at different distances from one another. For instance, a first pose may have them at a first distance, a second pose may have them at a second distance, etc.

In FIGS. 2C and 2D, the actuable members 186A and 186B are in poses that conform to the grasp approach vector 248 and that avoid collision with spatula 202 and avoid collision with circular object 204. In FIGS. 2E and 2F, the actuable members 186A and 186B are in poses that conform to the grasp approach vector 248, but that collide with spatula 202 (FIG. 2E) and circular object 204 (FIG. 2F).

Figure 3:
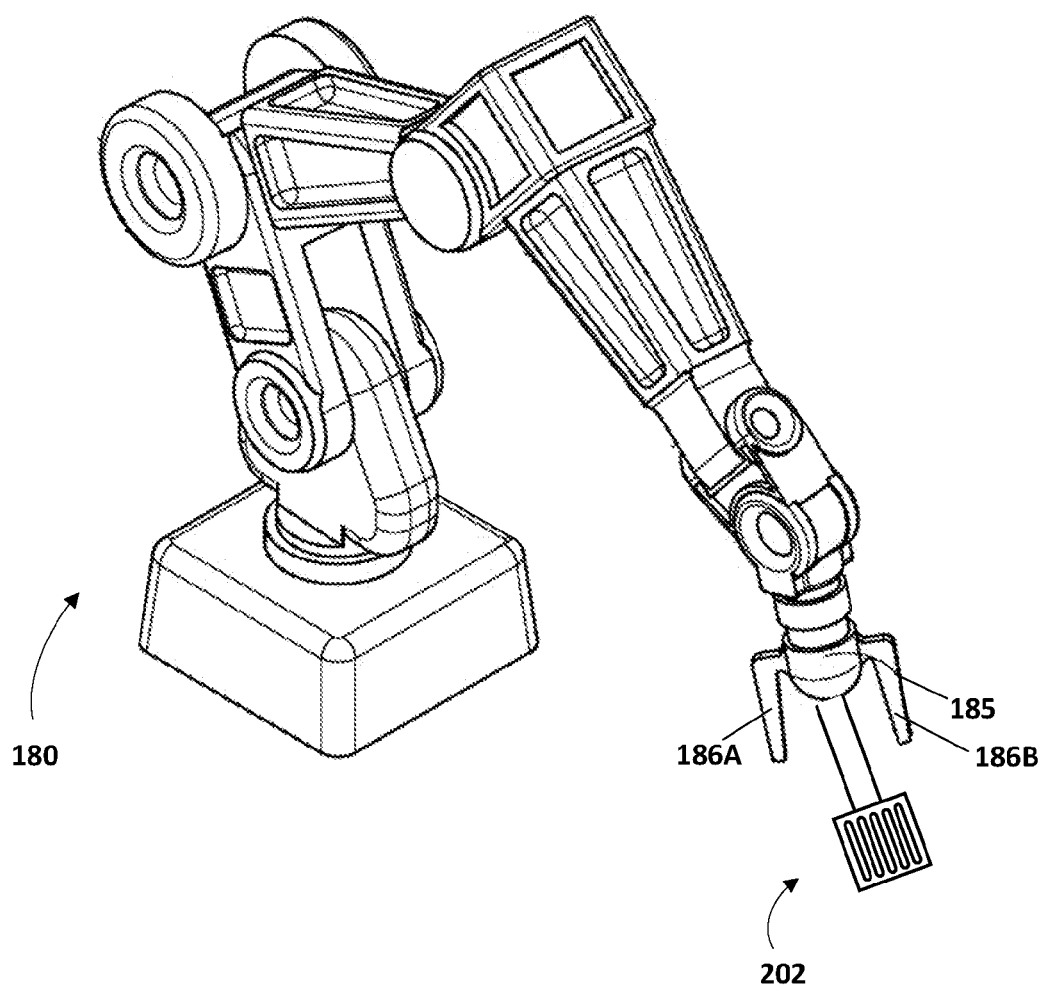
FIG. 3 illustrates one of the robots of FIG. 1, an example object, and an example grasp pose of a grasping end effector of the robot that may be determined based on disclosed implementations.

FIG. 3 illustrates the robot 180 with the grasping end effector 185 in a grasp pose determined based on disclosed implementations. From the grasp pose, the robot 180 may attempt a grasp of the object by further adjustment of the pose of the end effector 185. For instance, the robot 180 may move the end effector 185 along a path that conforms to the grasp approach vector determined by grasp constraint engine 116 and/or may move actuable members 186A and 186B toward one another to attempt a grasp. In some implementations, to attempt a grasp the robot 180 may optionally move actuable members 186A and 186B toward one another until they are either at a fully closed position or a torque reading or other reading measured by torque or other force sensor(s) associated with the members satisfies a threshold.

Figure 4:
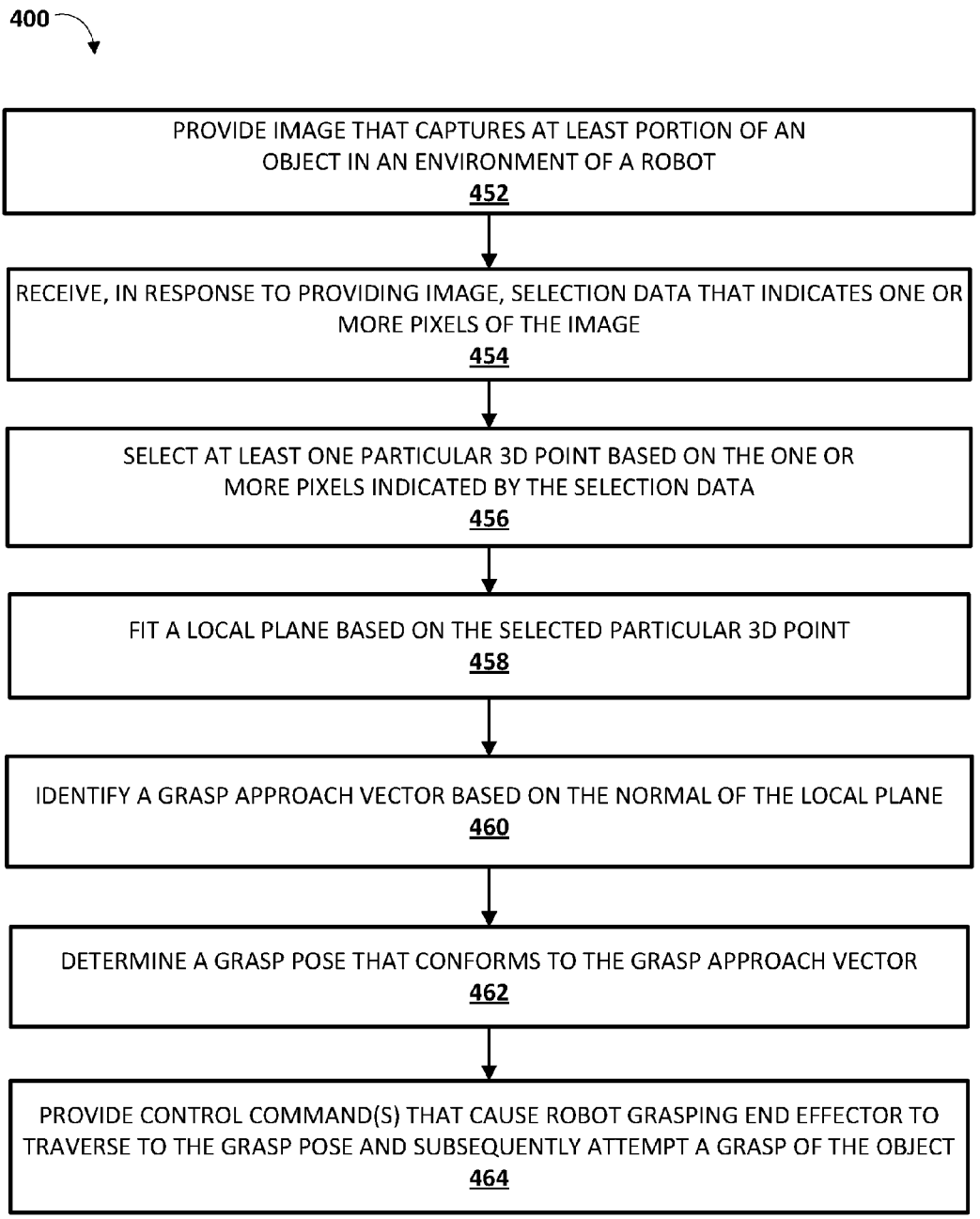
FIG. 4 is a flowchart illustrating an example method of generating a grasp pose, for grasping of an object by a grasping end effector of a robot, based on selection data received in response to providing an image of at least a portion of the object to a client computing device.

FIG. 4 is a flowchart illustrating an example method 400 of generating a grasp pose, for grasping of an object by a grasping end effector of a robot, based on selection data received in response to providing an image of at least a portion of the object to a client computing device. For convenience, the operations of the flow chart are described with reference to a system that performs the operations. This system may include one or more components of a robot, such as a processor and/or robot control system of robot 180, 190, 640, and/or other robot; and/or may include one or more components of computing device(s) that are separate from a robot, such as one or more of computing devices 120 or 710. Moreover, while operations of method 400 are shown in a particular order, this is not meant to be limiting. One or more operations may be reordered, omitted or added.

At block 452, the system provides an image that captures at least a portion of an object in an environment of a robot. The image is provided for display to a user on a client computing device of the user and the image is generated based on image data generated by one or more cameras that are associated with a robot and that are viewing the environment of the robot. The camera(s) may be affixed to the robot or separate from the robot.

At block 454, the system receives selection data that indicates one or more pixels of the image. The selection data is received in response to providing the image at block 452 and indicates one or more pixels of the image provided at block 452. The selected pixels are a subgroup of the pixels of the image and the selected pixels are selected by a user via a user interface input device of the client computing device that provided the image for display to the user. In some implementations, the selection by the user may be a single selection such as a single click, tap, etc. In some implementations, the selection by the user may be multiple selections, such as an antipodal selection.

At block 456, the system selects at least one particular 3D point based on the one or more pixels indicated by the selection data of block 454. For example, where the selection is a single selection, the system may select at least one particular 3D point that maps directly to a pixel indicated by the single selection. Also, for example, where the selection is an antipodal selection, the system may determine an additional pixel based on pixels that correspond to the antipodal selection, and select at least one particular 3D point that maps directly to the additional pixel.

At block 458, the system fits a local plane based on the particular 3D point selected at block 456. In some implementations, the system fits the local plane based on the particular 3D point and based on one or more additional 3D points that are in a neighborhood of the particular 3D point.

At block 460, the system identifies a grasp approach vector based on a normal of the local plane fit at block 458. In some implementations, the system may determine a grasp approach vector to be a vector that is opposite from the normal, but otherwise strictly conforms to the normal.

At block 462, the system determines a grasp pose that conforms to the grasp approach vector. For example, the system may employ a collision checker to generate multiple candidate grasp poses that each conform to the grasp approach vector (e.g., with a rotational axis of the grasping end effector aligned with the approach vector) and do not collide with the target object and/or with other object in the environment with the object. The system may select one of the candidate grasp poses as the grasp pose, optionally utilizing one or more selection criteria.

At block 464, the system provides control command(s) that cause the robot grasping end effector to traverse to the grasp pose and subsequently attempt a grasp of the object.

Figure 5A:
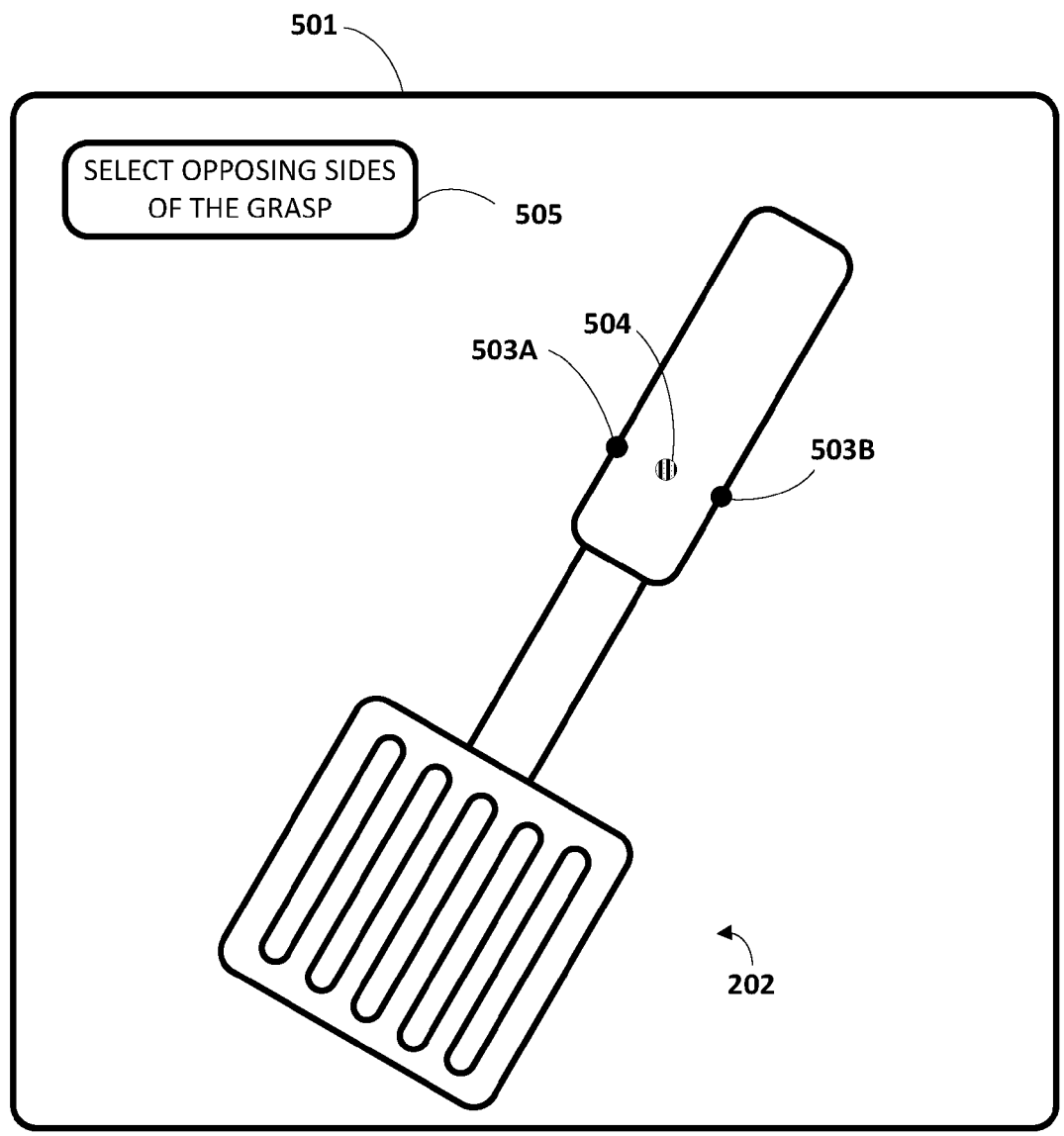
FIG. 5A illustrates an example graphical user interface that may be provided for display on a client computing device; the example graphical user interface of FIG. 5A includes an image of an object in a robot's environment and also illustrates an example of an antipodal selection that may be made by a user via a user interface input device of the client computing device.
Figure 5B:
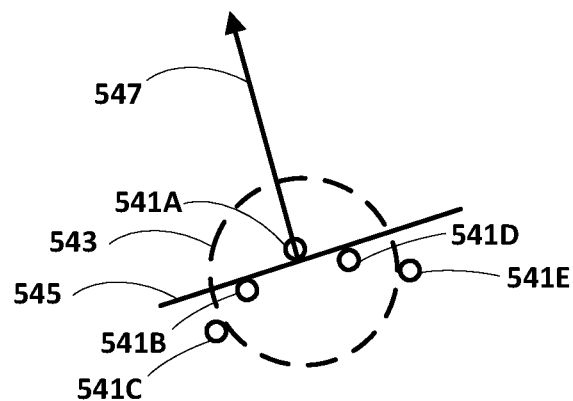
FIG. 5B illustrates some 3D points of a 3D point cloud that captures at least a portion of the surface of the object of FIG. 5A.
Figure 5C:
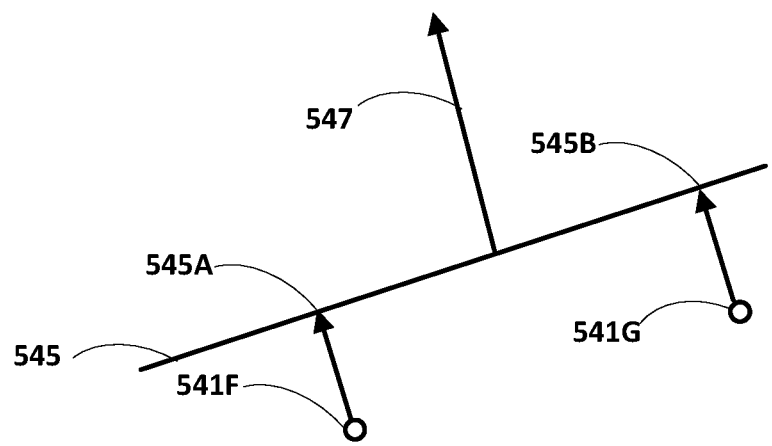
FIG. 5C illustrates two additional 3D points that map to pixels associated with the antipodal selections of FIG. 5A and shows a projection of those 3D points to coordinates of the local plane of FIG. 5B.

With reference to FIGS. 5A-5C, additional description is provided of an example of how multiple selections of an image may be utilized to determine a grasp pose for grasping of an object by a grasping end effector.

FIG. 5A illustrates an example of an image that may be provided by image engine 112 for display on one of the client computing devices 120. FIG. 5A illustrates an example graphical user interface 501 that may be displayed by one of the client computing devices 120. The example graphical user interface 501 of FIG. 5A includes an image of a spatula 202 and is generated based on image data from one or more cameras associated with a robot and viewing the environment of the robot. For example, the image may be generated based on image data from stereographic camera 184 while the spatula 202 is in the environment of the robot 180. The graphical user interface 501 also includes a notification 505 that informs the user viewing the graphical user interface 501 of the type of selection that should be made to provide input for generating the grasp of the target object.

FIG. 5A also illustrates indications 503A and 503B of an antipodal selection that may be made by a user via a user interface input device of the client computing device. The first selection indicated by indication 503A may be in response to a first selection of the user via a user interface input device and the second selection indicated by indication 503B may be in response to a separate second selection of the user via the user interface input device.

The 3D point selection engine 114 receives selection data in response to the selections indicated by indications 503A and 503B. The selection data indicates one or more first pixels corresponding to the selection indicated by indication 503A and one or more second pixels corresponding to the selection indicated by indication 503B. The 3D point selection engine 114 may utilize the first pixels and the second pixels to determine one or more particular 3D points that do not map directly to the first pixels or to the second pixels. For example, in some implementations the first pixels and the second pixels may be utilized to determine one or more additional pixels in the image, such as one or more pixels that are "between" the pixels associated with the two selections (e.g., a pixel that is midway between the pixels of the two selections)—and the 3D point selection engine 114 may determine one or more particular 3D points that map directly to those additional pixel(s). For instance, the 3D point selection engine 114 may determine one or more additional pixel(s) corresponding to indication 504 of FIG. 5A and determine a particular 3D point that is mapped directly to the additional pixel(s). Note that the additional pixel(s) corresponding to indication 504 are not actively selected by the user. Rather, pixels corresponding to the selections indicated by indications 503A and 503B are actively selected by the user and are utilized to determine the additional pixel(s), which is then used to determine one or more particular 3D points.

FIG. 5B illustrates an example of determining a grasp approach vector based on the selections of FIG. 5A. FIG. 5B illustrates some 3D points 541A-E of a 3D point cloud that captures at least a portion of the surface of the spatula 502 of FIG. 5A. It is understood that the 3D point cloud contains many additional points than those illustrated in FIG. 5B. Further, it is noted that FIG. 5B illustrates positions of the 3D points 541A-E in only two dimensions and that each of the 3D points 541A-E have a position in another dimension (one that extends "into" and "out of" the Figure) that may vary from the positions of other of the 3D points 541A-E in that dimension.

In FIG. 5B, 3D point 541A is the particular 3D point selected by 3D point selection engine 114 based on the additional pixel(s) determined based on the selected pixels indicated by selection data. Local plane 545 is a local plane that may be fit by grasp constraint engine 116 based on the 3D point 541A and based on one or more additional 3D points, such as additional 3D points 541B and 541D that are in a neighborhood 543 of the 3D point 541A. FIG. 5B also illustrates a normal 547 of the local plane 545 that is determined by the grasp constraint engine 116 based on the local plane 545 and optionally based on directions of determined normal(s) for the particular 3D point 541A and/or additional 3D points (e.g., additional 3D points 541B and/or 541D).

The grasp constraint engine 116 determines a grasp approach vector based on the normal 547 and defines the grasp approach vector as a constraint for a grasp pose. For instance, the grasp constraint engine 116 may determine a grasp approach vector to be a vector that is opposite from the normal, but otherwise strictly conforms to the normal.

The grasp generation engine then determines a grasp pose of a grasping end effector based on the approach vector. For example, as described above, a collision checker can be utilized to explore multiple grasp pose candidates and find a valid one that does not collide with the object and/or with other objects in the environment with the object. In some implementations, the grasp pose is further determined based on additional 3D points that map directly to the pixel(s) corresponding to the selections indicated by indications 503A and 503B of FIG. 5A. For example, the grasp pose may be determined based on additional constraints determined based on additional 3D points mapped directly to those pixels. As one example, those additional 3D points may be projected to coordinates in the local plane that was fit based on the 3D point mapped to the "additional pixel", and a grasp pose determined based on conformance of the grasp pose to those coordinates (e.g., strict conformance or conformance within a range).

An example of this is described in more detail with respect to FIG. 5C. FIG. 5C illustrates the local plane 545 and the normal 547 of FIG. 5B and also illustrates two additional 3D points 541F and 541G that map directly to pixels associated with the selections indicated by indications 503A and 503B of FIG. 5A. FIG. 5C also shows projections of the 3D points 541F and 541G to coordinates 545A and 545B of the local plane 545. In determining a grasp pose that conforms to the grasp approach vector determined based on normal 547, the grasp generation engine 118 may also optionally utilize one or more additional constraints that are based on the coordinates 545A and 545B. For example, the grasp generation engine 118 may restrict explored orientations of the grasping end effector about its central axis based on the coordinates 545A and 545B. Also, for example, the engine 118 may require that a determined grasp pose be one where one or more actuable members of the grasping end effector are within a threshold distance of the coordinates 545A and 545B and/or be aligned with the coordinates 545A and 545B in one or more dimensions.

Figure 6:
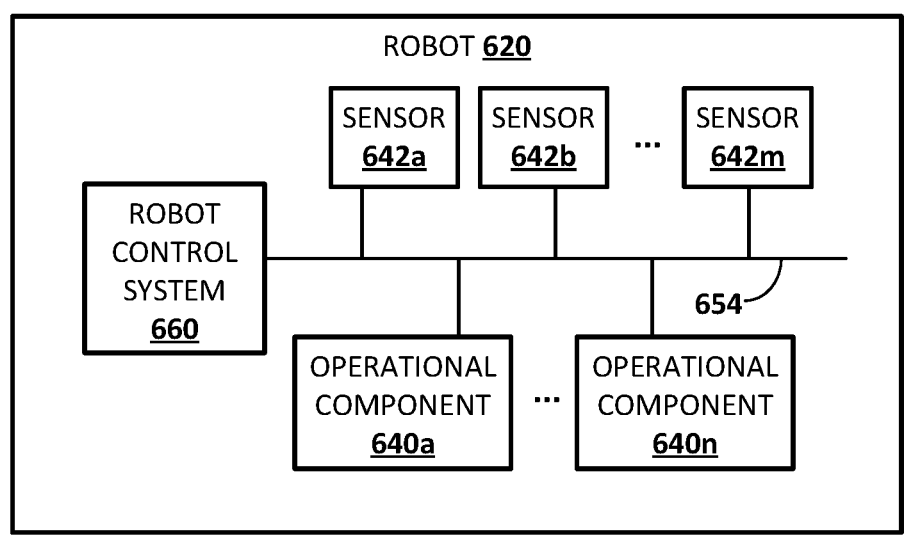
FIG. 6 schematically depicts an example architecture of a robot.

FIG. 6 schematically depicts an example architecture of a robot 620. The robot 620 includes a robot control system 660, one or more operational components 640a-640n, and one or more sensors 642a-642m. The sensors 642a-642m may include, for example, vision sensors (e.g., camera(s), 3D scanners), light sensors, pressure sensors, pressure wave sensors (e.g., microphones), proximity sensors, accelerometers, gyroscopes, thermometers, barometers, and so forth. While sensors 642a-m are depicted as being integral with robot 620, this is not meant to be limiting. In some implementations, sensors 642a-m may be located external to robot 620, e.g., as standalone units.

Operational components 640a-640n may include, for example, one or more end effectors (e.g., grasping end effectors) and/or one or more servo motors or other actuators to effectuate movement of one or more components of the robot. For example, the robot 620 may have multiple degrees of freedom and each of the actuators may control actuation of the robot 620 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 620. In some implementations, the robot 620 may comprise a "brain box" that may include all or aspects of the control system 660. For example, the brain box may provide real time bursts of data to the operational components 640a-n, with each of the real time bursts comprising a set of one or more control commands that dictate, inter alia, the parameters of motion (if any) for each of one or more of the operational components 640a-n. In some implementations, the robot control system 660 may perform one or more aspects of method 400 described herein.

As described herein, in some implementations all or aspects of the control commands generated by control system 660 in positioning an end effector to grasp an object may be based on control commands generated based on a grasp pose determined according to implementations disclosed herein. Although control system 660 is illustrated in FIG. 6 as an integral part of the robot 620, in some implementations, all or aspects of the control system 660 may be implemented in a component that is separate from, but in communication with, robot 620. For example, all or aspects of control system 660 may be implemented on one or more computing devices that are in wired and/or wireless communication with the robot 620, such as computing device 710.

Figure 7:
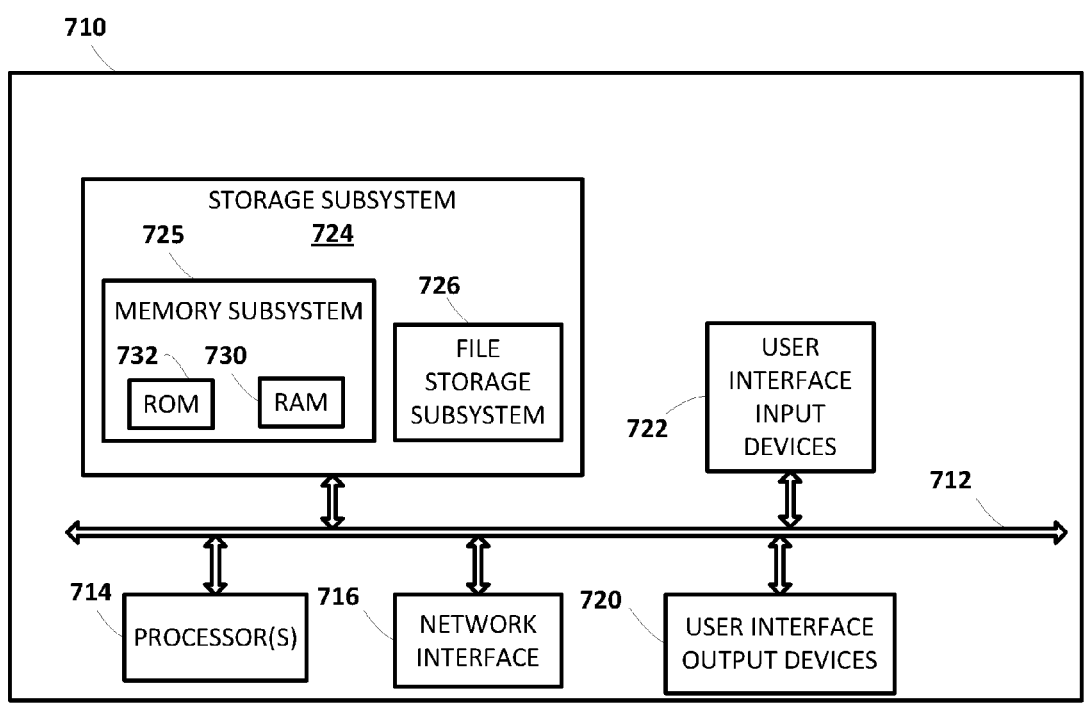
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 4.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   providing an image for display on a client computing device, the image capturing at least a portion of an object in an environment and being generated based on image data generated by one or more cameras that are associated with a robot and that are viewing the environment;
   receiving selection data in response to providing the image, the selection data indicating one or more selected pixels of the image, the selected pixels being a subgroup of pixels of the image and being selected by a user via a user interface input device of the client computing device;
   selecting, based on the one or more selected pixels indicated by the selection data, at least one particular three-dimensional (3D) point from a group of 3D points, the group of 3D points being generated based on the image data generated by the cameras or determined based on additional sensor data generated by a 3D scanner that is associated with the robot and that is viewing the environment;
   fitting a local plane based on the particular 3D point and based on one or more additional 3D points, of the group of 3D points, that are in a neighborhood of the particular 3D point;
   identifying a grasp approach vector based on a normal of the local plane;
   determining a grasp pose that conforms to the grasp approach vector and that avoids collision with the object and with other objects in the environment; and
   providing one or more control commands that cause a grasping end effector of the robot to traverse to the grasp pose and attempt a grasp of the object subsequent to traversing to the grasp pose.

2. The method of claim 1, wherein the one or more selected pixels are selected based on a single selection via the user interface input device.

3. The method of claim 2, wherein selecting the particular 3D point based on the selected pixels comprises:
   determining that the particular 3D point is mapped directly to one pixel of the one or more selected pixels.

4. The method of claim 3, wherein the 3D point is determined based on the image data utilized to generate the image and further comprising:
   mapping the one pixel to the particular 3D point based on the one pixel being utilized to generate the particular 3D point.

5. The method of claim 1, wherein determining the grasp pose comprises:
   generating a plurality of candidate grasp poses that each conform to the grasp approach vector; and
   selecting the grasp pose from the candidate grasp poses based on:
      the grasp pose avoiding collision with the object and with other objects in the environment, or
      one or more additional criteria.

6. The method of claim 1, wherein the one or more selected pixels comprise a plurality of pixels selected based on at least two selections via the user interface input device.

7. The method of claim 6, wherein the particular 3D point is not mapped directly to any of the selected pixels.

8. The method of claim 6, wherein the two selections are opposed to one another and the particular 3D point is between, in at least one dimension, other 3D points that are mapped directly to the selected pixels.

9. The method of claim 8, wherein selecting the particular 3D point based on the selected pixels comprises:
determining an additional pixel that is between, in the image, the selected pixels of the two selections; and
selecting the particular 3D point based on the particular 3D point being mapped directly to the additional pixel.

10. The method of claim 8, wherein determining the grasp pose further comprises:
determining the grasp pose based on the other 3D points that are mapped directly to the selected pixels.

11. The method of claim 10, wherein determining the grasp pose based on the other 3D points that are mapped directly to the selected pixels comprises:
projecting the other 3D points to coordinates in the local plane; and
determining the grasp pose based on conformance of one or more actuable members of the grasping end effector to the coordinates in the local plane.

12. A method implemented by one or more processors, comprising:
determining a group of three-dimensional (3D) points derived from image data generated by a stereographic camera associated with a robot, the group of 3D points capturing at least a portion of a surface of an object in an environment;
providing, for display on a client computing device, a two-dimensional image that includes at least the portion of the surface of the object, the two-dimensional image being generated based on at least some of the image data generated by the stereographic camera;
receiving selection data in response to providing the image, the selection data indicating one or more selected pixels of the image, the selected pixels being a subgroup of pixels of the image and being selected by a user via a user interface input device of the client computing device;
selecting at least one particular 3D point of the group of 3D points, the particular 3D point being selected based on it being generated based on at least one pixel of the one or more selected pixels indicated by the selection data;
determining a grasp approach vector based on the particular 3D point;
determining a grasp pose that conforms to the grasp approach vector; and
providing one or more control commands that cause a grasping end effector of the robot to traverse to the grasp pose and attempt a grasp of the object subsequent to traversing to the grasp pose.

13. The method of claim 12, wherein determining the grasp approach vector based on the particular 3D point comprises:
fitting a local plane based on the particular 3D point and based on one or more additional 3D points, of the group of 3D points, that are in a neighborhood of the particular 3D point; and
identifying the grasp approach vector based on a normal of the local plane.

14. The method of claim 13, wherein the grasp approach vector conforms strictly to the normal of the local plane.

15. The method of claim 12, wherein determining the grasp pose that conforms to the grasp approach vector comprises:
employing a collision checker using the grasp approach vector as a constraint and using the group of 3D points as obstacles.

16. A system, comprising:
a stereographic camera viewing an environment of a robot;
at least one processor configured to:
determine a group of three-dimensional (3D) points based on image data of the stereographic camera, the group of 3D points capturing at least a portion of a surface of an object in an environment;
provide, for display on a client computing device, a two-dimensional image that includes at least the portion of the surface of the object, the two-dimensional image being generated based on at least some of the image data generated by the stereographic camera;
receive selection data in response to providing the image, the selection data indicating one or more selected pixels of the image, the selected pixels being a subgroup of pixels of the image and being selected by a user via a user interface input device of the client computing device;
select at least one particular 3D point of the group of 3D points, the particular 3D point being selected based on it being generated based on at least one pixel of the one or more selected pixels indicated by the selection data;
determine a grasp approach vector based on the particular 3D point; and
determine a grasp pose that conforms to the grasp approach vector.

17. The system of claim 16, wherein in determining the grasp approach vector based on the particular 3D point the processor is configured to:
fit a local plane based on the particular 3D point and based on one or more additional 3D points, of the group of 3D points, that are in a neighborhood of the particular 3D point; and
identify the grasp approach vector based on a normal of the local plane.

18. The system of claim 16, wherein in determining the grasp pose that conforms to the grasp approach vector the processor is configured to:
employ a collision checker using the grasp approach vector as a constraint and using the group of 3D points as obstacles.

* * * * *